US005936516A

United States Patent [19]

Narea et al.

[11] Patent Number: 5,936,516

[45] Date of Patent: Aug. 10, 1999

[54] VIBRATING APPARATUS AND METHOD THEREFOR

[75] Inventors: Jaime Narea, Oakbrook, Ill.; Daniel Przybylski, Boca Raton, Fla.

[73] Assignee: Motorola, Inc., Schaumburg, Ill.

[21] Appl. No.: 08/797,648

[22] Filed: Jan. 31, 1997

[51] Int. Cl.[6] .......... H04B 3/36

[52] U.S. Cl. .......... 340/407.1; 340/825.46

[58] Field of Search .......... 340/407.1, 311.1, 340/825.46, 825.44; 379/52; 434/114

[56] References Cited

U.S. PATENT DOCUMENTS

| | | | |
|---|---|---|---|
| 5,107,540 | 4/1992 | Mooney et al. | 340/407.1 |
| 5,172,092 | 12/1992 | Nguyen et al. | 340/407.1 |
| 5,229,744 | 7/1993 | Ogura | 340/825.46 |
| 5,436,622 | 7/1995 | Gutman et al. | 340/407.1 |
| 5,519,303 | 5/1996 | Goedken et al. | 320/35 |
| 5,554,971 | 9/1996 | Foster et al. | 340/407.1 |
| 5,682,132 | 10/1997 | Hiroyoshi et al. | 340/825.46 |

FOREIGN PATENT DOCUMENTS

| | | | |
|---|---|---|---|
| 2551875 | 5/1977 | Germany | 340/407.1 |

*Primary Examiner*—Brent A. Swarthout

*Attorney, Agent, or Firm*—John J. Oskorep; Richard K. Clark

[57] ABSTRACT

A vibrating apparatus (200) comprises a vibrating element (202), electromagnetic coils (204, 206), driver circuits (210, 212), and a controller (208) coupled to the electromagnetic coils (204, 206) through driver circuits (210, 212). The vibrating element (202) has a first end fixedly mounted to a housing (106) and a second end having a permanent magnet (216) attached thereto. The electromagnetic coil (204) is positioned adjacent to the permanent magnet (216), and the electromagnetic coil (206) is positioned adjacent to the permanent magnet (216) on a side opposite the electromagnetic coil (204). The controller (208) generates signals to the electromagnetic coils (204, 206) through the driver circuits (210, 212) for producing magnetic fields around the electromagnetic coils (204, 206), where the magnetic fields attract and repel the permanent magnet (216) such that the vibrating element (202) vibrates at its resonating frequency.

16 Claims, 2 Drawing Sheets

VIBRATING APPARATUS AND METHOD THEREFOR

FIELD OF THE INVENTION

This invention relates generally to vibrating apparatus, and more particularly to vibrating apparatus of radiotelephones and pagers.

BACKGROUND OF THE INVENTION

Many portable electronic devices, such as radiotelephones and pagers, vibrate in response to a predetermined signal. The vibration provides a silent alert, announcing an incoming call, page, or other condition. To provide such vibration, a portable electronic device typically includes a vibrating apparatus having a conventional vibrating motor. A conventional vibrating motor produces vibration by rotating a shaft having an unbalanced mass attached thereto.

In general, it is advantageous for a portable electronic device to be small, light-weight, inexpensive, and reliable. However, a conventional vibrating motor is typically large, weighty, and expensive, and may have a short life expectancy and reliability problems.

Accordingly, there is a resulting need for an alternative to a conventional vibrating motor in a vibrating apparatus.

DETAILED DESCRIPTION OF THE PREFERRED EMBODIMENTS

According to the present invention, a vibrating apparatus comprises a vibrating element, an electromagnetic coil, and a signal generator. The vibrating element has a first end fixedly mounted and a second end that includes a ferromagnetic material. The electromagnetic coil is coupled to the signal generator and positioned adjacent to the ferromagnetic material. The signal generator generates a signal to the electromagnetic coil for producing magnetic fields therearound, where the magnetic fields exert magnetic forces on the ferromagnetic material to vibrate the vibrating element.

Figure 1:
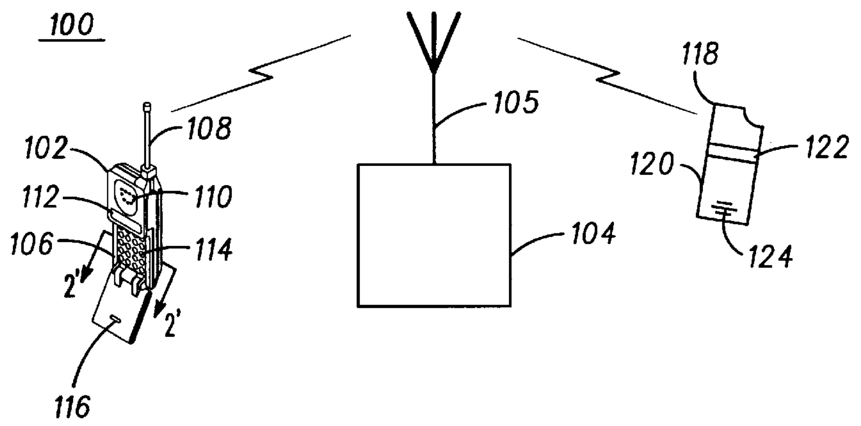
FIG. 1 is a block diagram illustration showing a communication system that includes a portable communication device such as a radiotelephone or a pager.

FIG. 1 shows a block diagram illustration of a communication system 100 that includes a mobile station 102 and a base station 104. Mobile station 102 is a portable communication device which may be more commonly referred to as a radiotelephone. Mobile station 102 comprises a housing 106, an antenna 108, a speaker 110, a display 112, a keypad 114, a microphone 116, and a battery (not shown) for electrical operation. For portable convenience, housing 106 of mobile station 102 is sized to fit within a user's hand.

In communication system 100, mobile station 102 provides telephone communications for a user thereof. Keypad 114 is provided for initiating telephone calls, and speaker 110 and microphone 116 are provided for listening and talking during telephone conversations. Base station 104 is connected to a telephone land line network (not shown). Mobile station 102 and base station 104 wirelessly communicate via radio frequency (RF) signals generated by electrical circuitry of mobile station 102 and base station 104. The RF signals are transmitted and received to and from mobile station 102 and base station 104 through antennas 108 and 105, respectively. Thus, two-way voice communication is provided between mobile station 102 and base station 104. Upon receipt of a telephone call, mobile station 102 alerts a user by sounding an audible ringing signal through speaker 110 or, alternatively, by vibrating. To provide such a vibrating alert, mobile station 102 includes a vibrating apparatus (not shown in FIG. 1) disposed within housing 106.

Alternatively, communication system 100 may be designed for communications with a mobile station 118. Mobile station 118 is a portable communication device which may be more commonly referred to as a pager. Mobile station 118 includes a housing 120, a display 122, a speaker 124, an antenna (not visible), and a battery (not shown) for electrical operation. For paging and sending data information to mobile station 118, base station 104 establishes and maintains a one-way wireless communication link thereto. Upon receipt of a page, mobile station 118 displays data on display 122 and alerts a user by sounding an audible alert signal through speaker 124 or, alternatively, by vibrating. To provide such a vibrating alert, mobile station 118 includes a vibrating apparatus (not shown in FIG. 1) disposed within housing 120.

Figure 2:
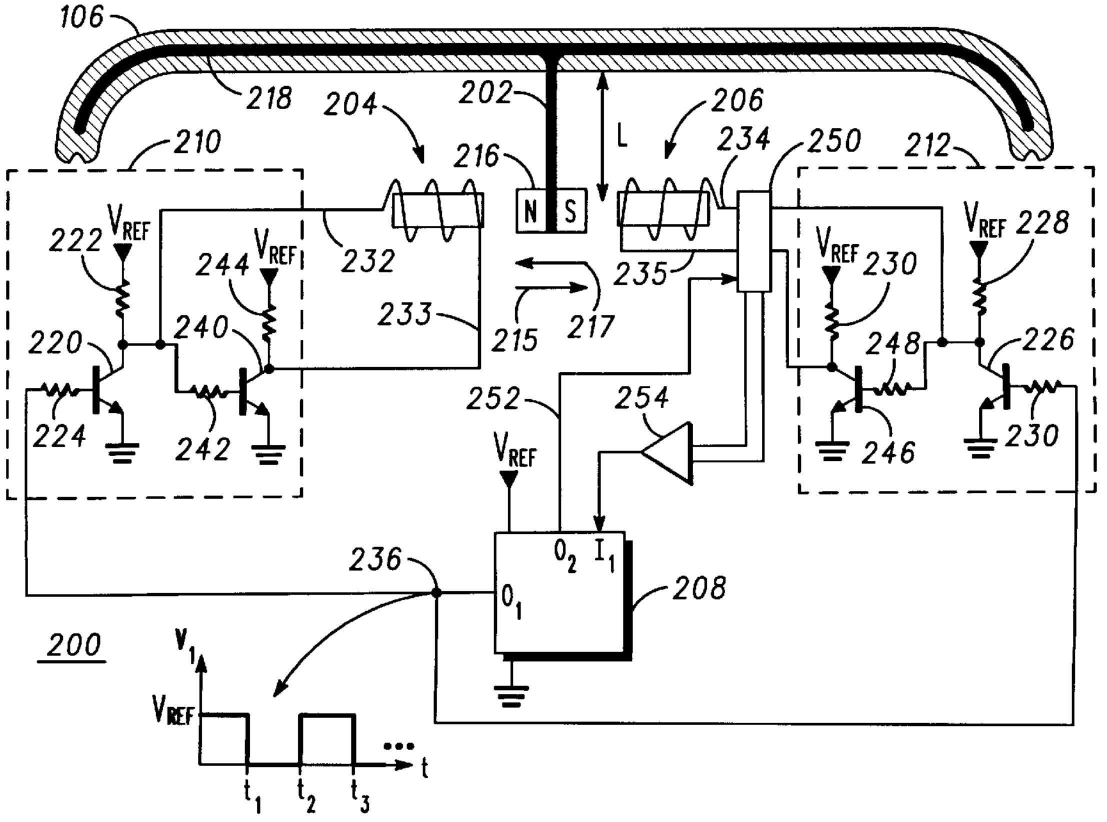
FIG. 2 shows a schematic diagram of a vibrating apparatus in accordance with the present invention and a cross-sectional view of a portion of a housing of the radiotelephone taken along line 2—2' of FIG. 1.

FIG. 2 shows a schematic diagram of a vibrating apparatus 200 in accordance with the present invention and a cross-sectional view of a portion of housing 106 taken along line 2—2' of FIG. 1. In the illustrated embodiment, vibrating apparatus 200 comprises a vibrating element 202, a permanent magnet 216, a vibrating body 218, electromagnetic coils 204 and 206, driver circuits 210 and 212, a controller 208, a switching circuit 250, and a detector 254. In a typical configuration, electromagnetic coils 204 and 206, driver circuits 210 and 212, controller 208, switching circuit 250, and detector 254 are disposed and soldered onto a printed circuit board (PCB) (not shown) disposed within housing 106.

Vibrating element 202 has a first end fixedly mounted to housing 106 and a second end having permanent magnet 216 attached thereto. Vibrating element 202, which is preferably manufactured from a metal, has a length L, a width W, and a thickness T that is many times smaller than length L. Having such construction, vibrating element 202 is indeed pliable and, as shown in FIG. 2, can bend in the directions indicated by arrows 215 and 217. Thus, as described here, vibrating element 202 may be referred to as a pliable element. Vibrating element 202 can vibrate at a resonating frequency which is determined at least in part by length L. In a tested configuration, vibrating element 202 has a length L=26 mm, a width W=3 mm, and a thickness T=1 mm, and a resonating frequency in a range of about 95 to 125 Hz. Of course, other suitable dimensions and resonating frequencies may be selected.

The first end of vibrating element 202 is integrally attached to vibrating body 218 embedded within housing 106. Vibrating body 218 has a shape that forms to a shape of a portion of housing 106. Preferably, vibrating body 218 and vibrating element 202 are manufactured and formed from the same material, preferably a ferromagnetic material.

The second end of vibrating element 202 has permanent magnet 216 attached thereto. Permanent magnet 216 is made of a ferromagnetic material, such as iron, and is small in size and weight. Permanent magnet 216 is indeed polarized, having a north pole and a south pole as designated in FIG. 2. In the tested configuration, permanent magnet 216 has dimensions of approximately 3 mm×4 mm×5 mm and weighs about 6 grams.

Electromagnetic coils 204 and 206 each include a cylindrical core and an electrical conductor winding. Here, each cylindrical core includes a hollow cylinder made of plastic. Each electrical conductor winding is made of an electrically conductive material, preferably copper, and is wound several times around a corresponding hollow cylinder. In the tested configuration, each electrical conductor winding is wrapped around a corresponding hollow cylinder in a circle having a total diameter of about 7 mm, where each hollow cylinder encompasses about 4 mm of an inner diameter of the circle, and where each electrical conductor winding is wound about 100 to 150 times to a thickness of about 3 mm of an outer diameter of the circle.

Electromagnetic coil 204 is positioned adjacent to permanent magnet 216, and electromagnetic coil 206 is positioned adjacent to permanent magnet 216 on a side substantially opposite electromagnetic coil 204. The electrical conductor winding of electromagnetic coil 204 has a first end 232 and a second end 233 coupled to driver circuit 210, and the electrical conductor winding of electromagnetic coil 206 has a first end 234 and a second end 235 coupled to driver circuit 212 through switching circuit 250. As will be discussed further below, switching circuit 250 allows signals to freely pass from driver circuit 212 to electromagnetic coil 206 during standard operation. Electromagnetic coils 204 and 206 and permanent magnet 216 are positioned such that when current flows through the electrical conductor windings of electromagnetic coils 204 and 206, magnetic fields that have an intensity sufficient to magnetically attract and repel permanent magnet 216 are generated. In the tested configuration, an "air gap" or distance between an end of permanent magnet 216 and an end of one of electromagnetic coils 204 and 206 is about 5 mm.

Preferably, electromagnetic coils 204 and 206 are embedded within portions of housing 106 (and not physically located on the PCB) to secure such positioning and to protect against mechanical failure. In addition, for producing stronger magnetic fields around electromagnetic coils 204 and 206, each cylindrical core may comprise a ferromagnetic core. However, this may undesirably increase the weight of vibrating apparatus 200.

Driver circuits 210 and 212 provide power to drive and produce the magnetic fields around electromagnetic coils 204 and 206, respectively. In the illustrated embodiment, driver circuit 210 includes a transistor 220 having a collector coupled to a reference voltage through a resistor 222, an emitter coupled to ground, and a base coupled an output 236 of controller 208 through a resistor 224. Driver circuit 210 also includes a transistor 240 having a collector coupled to the reference voltage through a resistor 244, an emitter coupled to ground, and a base coupled to the collector of transistor 220 through a resistor 242. Electromagnetic coil 204 is coupled to driver circuit 210 where first end 232 is coupled to the collector of transistor 220 and second end 233 is coupled to the collector of transistor 240.

Similarly, driver circuit 212 includes a transistor 226 having a collector coupled to the reference voltage through a resistor 228, an emitter coupled to ground, and a base coupled to output 236 through a resistor 230. Driver circuit 212 also includes a transistor 246 having a collector coupled to the reference voltage through a resistor 230, an emitter coupled to ground, and a base coupled to the collector of transistor 226 through a resistor 248. Electromagnetic coil 206 is coupled to driver circuit 212 where first end 234 is coupled to the collector of transistor 226 and second end 235 is coupled to the collector of transistor 246.

As will be more readily understood from the embodiments described below, controller 208 may simply be a signal generator or, alternatively, a processor that is capable of performing a wide variety of tasks.

Figure 3:
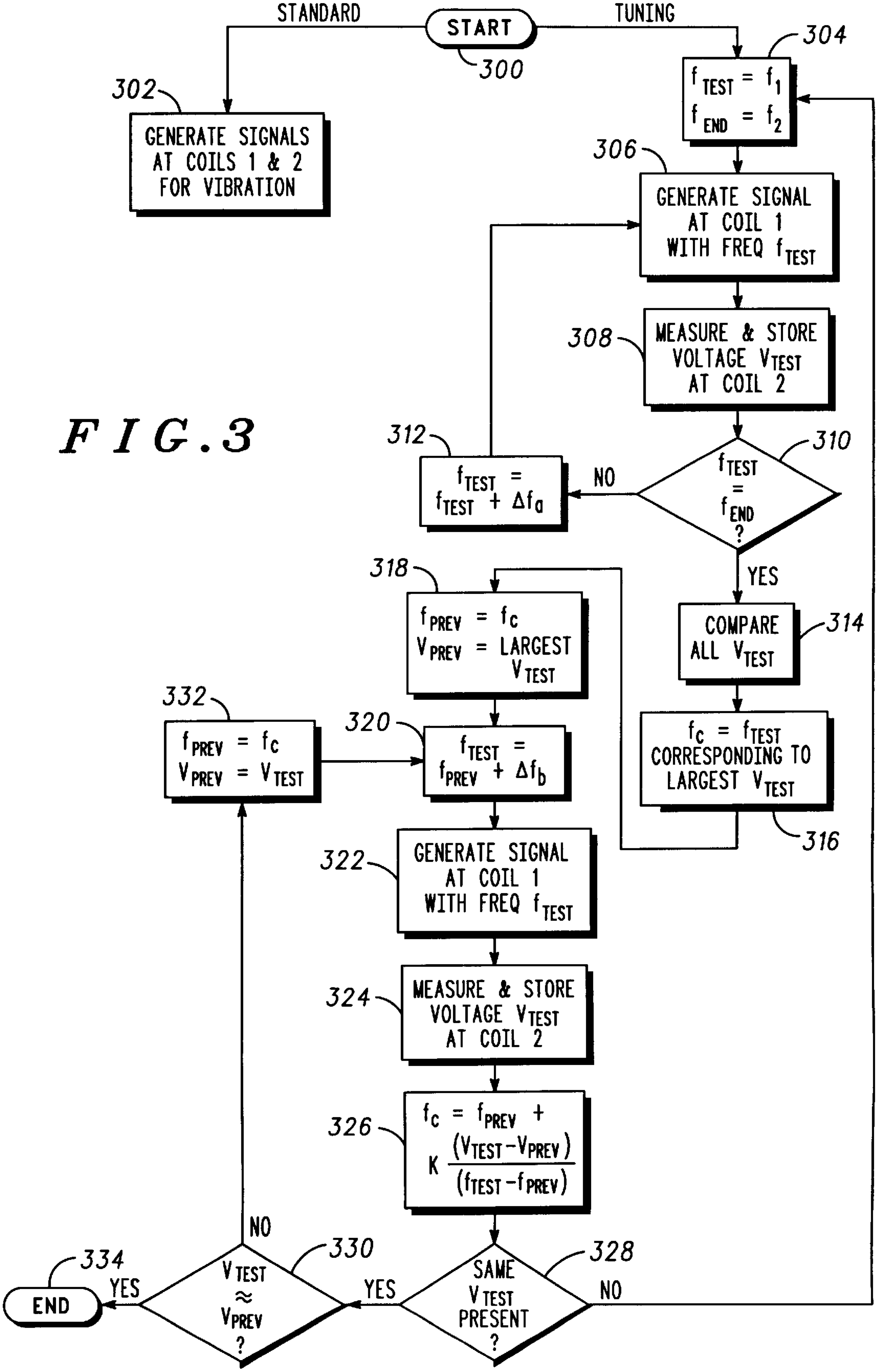
FIG. 3 is a flowchart of a method of operating the vibrating apparatus of FIG. 2.

FIG. 3 shows a flowchart of a method of operating vibrating apparatus 200. The flowchart shows a first path for standard operation of vibrating apparatus 200 (starting from step 300 to step 302), and a second path for tuning operation of vibrating apparatus 200 (starting from step 300 to step 304).

For standard operation of vibrating apparatus 200, controller 208 generates an electrical signal at output 236 (step 302). This signal is generated in response to some input signal at mobile station 102, such as a call receipt or a key actuation. Preferably, the signal from controller 208 is a square-wave signal having a frequency that is substantially the same as the resonating frequency of vibrating element 202. As shown in FIG. 2 at output 236, the square-wave signal periodically changes voltage from the reference voltage to ground.

When the square-wave signal is at the reference voltage, transistors 220 and 226 are on and transistors 240 and 246 are off. Here, first end 232 is biased at ground and second end 233 is biased at the reference voltage, and therefore electromagnetic coil 204 produces a magnetic field having a north pole adjacent to the north pole of permanent magnet 216. Likewise, first end 234 is biased at ground and second end 235 is biased at the reference voltage, and therefore electromagnetic coil 206 produces a magnetic field having a north pole adjacent to the south pole of permanent magnet 216. Thus, when the square-wave signal is changed to the reference voltage, electromagnetic coil 204 repels and electromagnetic coil 206 attracts permanent magnet 216 such that vibrating element 202 moves in a direction indicated by arrow 215.

When the square-wave signal is at ground, transistors 220 and 226 are off and transistors 240 and 246 are on. Here, first end 232 is biased at the reference voltage and second end 233 is biased at ground, and therefore electromagnetic coil 204 produces a magnetic field having a south pole adjacent to the north pole of permanent magnet 216. Likewise, first end 234 is biased at the reference voltage and second end 235 is biased at ground, and therefore electromagnetic coil 206 produces a magnetic field having a south pole adjacent to the south pole of permanent magnet 216. Thus, when the square-wave signal is changed to ground, electromagnetic coil 204 attracts and electromagnetic coil 206 repels permanent magnet 216 such that vibrating element 202 moves in a direction indicated by arrow 217.

Since the square-wave signal is periodic and repeats at a frequency that is substantially the same as the resonating frequency of vibrating element 202, vibrating element 202 vibrates continuously at its resonating frequency in the directions indicated by arrows 215 and 217. As vibrating element 202 vibrates, housing 106 correspondingly vibrates at an intensity sufficient to alert a user of mobile station 102.

In general, then, controller 208 generates electrical signals to electromagnetic coils 204 and 206 to produce magnetic fields therearound, where the magnetic fields attract and repel permanent magnet 216 such that vibrating element 202 vibrates at its resonating frequency. In the illustrated embodiment, electromagnetic coils 204 and 206 operate in combination to generate a continuous "push-pull" effect on permanent magnet 216. The magnetic fields generated around electromagnetic coil 204 are continuously 180° out-of-phase with the magnetic fields generated around electromagnetic coil 206.

Although controller 208 may generate a square-wave signal based upon a fixed, predetermined value for the resonating frequency, imperfections in manufacturing and design make it likely that the resonating frequency will vary from product to product. Therefore, vibrating apparatus 200 is preferably self-tuned to ensure that the signal from controller 208 is substantially the same as the resonating frequency of vibrating element 202. Such tuning may be performed in a factory immediately after manufacturing or, alternatively, each time the portable communication device is powered-up.

Switching circuit 250 is used for switching between standard operation and tuning operation. To configure vibrating apparatus 200 for tuning operation, controller 208 signals switching circuit 250 through a line 252. In response to this signal, first and second ends 234 and 235 of electromagnetic coil 206 are decoupled from driver circuit 212 and coupled to detector 254, which is in turn coupled to an input of controller 208. Thus, for tuning operation, electromagnetic coil 204 is still configured as an output to vibrate vibrating element 202, but electromagnetic coil 206 is configured as an input for measuring voltages induced by the movement of permanent magnet 216.

In general, the method of tuning vibrating apparatus 200 involves scanning a predetermined bandwidth in search for the resonating frequency of vibrating element 202. Vibrating apparatus 200 may be viewed as having a bandpass filter characteristic with a center frequency $f_c$ equivalent to the resonating frequency of vibrating element 202. The predetermined bandwidth is $f_1$ to $f_2$, where $f_1$ is the lowest possible resonating frequency and $f_2$ is the highest possible resonating frequency.

Referring back to FIGS. 2 and 3 in combination, controller 208 assigns $f_1$ to a test frequency $f_{TEST}$ and $f_2$ to an end frequency $f_{END}$ (step 304). Controller 208 generates a test signal at electromagnetic coil 204 having a frequency of $f_{TEST}$ (step 306). Depending on how close $f_{TEST}$ is to the actual resonating frequency, vibrating element 202 may or may not fully vibrate, or it may vibrate with a relatively low intensity. Assuming that vibrating element 202 vibrates with at least some intensity, a test voltage $v_{TEST}$ is induced within electromagnetic coil 206 and detected at detector 254. Controller 208 measures and stores $v_{TEST}$ (step 308). Controller 208 tests whether $f_{TEST}=f_{END}$ (step 310) which, if true, would signify the end of the tuning method. Assuming that $f_{TEST}\neq f_{END}$, controller 208 increments $f_{TEST}$ by $\Delta f_a$ (step 312) and repeats these steps at step 306.

When $f_{TEST}=f_{END}$ at step 310, controller 208 compares all of the stored values of $v_{TEST}$ (step 314). Since vibrating element 202 will vibrate at its greatest intensity and thus will induce the largest voltage in electromagnetic coil 206 when the signal from controller 208 has a frequency that matches the resonating frequency, controller 208 determines $f_c$ to be the $f_{TEST}$ corresponding to the largest value of $v_{TEST}$.

Thus, using the method described above, an approximate value for the resonating frequency can be found. Controller 208 uses this value during standard operation as described above in relation to step 302.

The method described above may be generally summarized as follows. During a first time period, controller 208 generates a first test signal having a first test frequency at electromagnetic coil 204, and measures a first test voltage at electromagnetic coil 206. During a second time period, controller 208 generates a second test signal having a second test frequency at electromagnetic coil 204, and measures a second test voltage at electromagnetic coil 206. Controller 208 compares the first and the second test voltages and selects, in response to comparing, one of the first and the second test frequencies for standard operation of vibrating apparatus 200. More particularly, controller 208 selects the first test frequency based upon the first test voltage being greater than the second test voltage, and selects the second test frequency based upon the second test voltage being greater than the first test voltage.

Using such a method, a very close approximation of the resonating frequency can be found by using a very small value of $\Delta f_a$. However, when $\Delta f_a$ is decreased, the time it takes to tune vibrating apparatus 200, $t_{TUNE}$, is undesirably increased. To find a close approximation of the resonating frequency without substantially increasing $t_{TUNE}$, $\Delta f_a$ is set to a relatively larger number, and further steps using a gradient algorithm are employed as follows.

Controller 208 assigns $f_c$ to $f_{PREV}$ (a previous test frequency) and assigns the largest value of $v_{TEST}$ to $v_{PREV}$ (a previous test voltage) (step 318). Controller 208 calculates $f_{TEST}$ to be the sum of $f_{PREV}$ and $\Delta f_b$ (step 320), where $\Delta f_b$ is generally a much smaller value than $\Delta f_a$. Controller 208 generates a test signal having a frequency of $f_{TEST}$ at electromagnetic coil 204 (step 322). Vibrating element 202 vibrates with some intensity, and therefore a test voltage $v_{TEST}$ is induced within electromagnetic coil 206 and detected at detector 254. Controller 208 measures and stores $v_{TEST}$ (step 324).

At step 326, controller 208 calculates $f_c$ to be:

$$f_c=f_{PREV}+k(v_{TEST}-v_{PREV})/(f_{TEST}-f_{PREV})$$

where k is a convergence factor constant. Thus, controller 208 calculates the resonating frequency to be a frequency that is equal to a sum of the previous test frequency and a number, the number being proportional to a ratio of a difference between the test voltage and the previous test voltage and a difference between the test frequency and the previous test frequency. The convergence factor constant, k, is a predetermined value that is determined by the electrical characteristics of vibrating apparatus 200, including the resonating frequency and the predetermined bandwidth of operation.

Next, controller 208 tests whether the same or similar test voltage $v_{TEST}$ is detected at electromagnetic coil 206 using the same test frequency $f_{TEST}$ (step 328). If the same $v_{TEST}$ is not found, then a source of noise is assumed to have been present at the time of the previous voltage detection, and the method is therefore repeated at step 304. If the same or similar $v_{TEST}$ is found, controller 208 proceeds and tests whether $v_{TEST}$ is approximately equal to $v_{PREV}$ (step 330). If step 330 is not true, then the closest approximation of the resonating frequency is not found, and so the steps are repeated as controller 208 assigns $f_c$ to $f_{PREV}$ and $v_{TEST}$ to $v_{PREV}$ (step 332). If step 330 is true, then the closest value of the resonating frequency is found, and the method is completed (step 334). Controller 208 uses $f_c$ during standard operation of vibrating apparatus 200 during step 302.

It is understood that steps 318 through 334 may be used as a completely separate method (without applying steps 304 through 316) once two test frequencies and two corresponding test voltages have been generated and obtained.

Thus, since vibrating apparatus 200 is comprised of components that are small, light-weight, and inexpensive, the overall size, weight, and cost of a vibrating apparatus (and a portable electronic device that includes such an apparatus) is reduced. Reliable operation of vibrating apparatus 200 is ensured through self-tuning methods for locating the resonating frequency of vibrating element 202.

While particular embodiments of the present invention have been shown and described, modifications may be made. For example, although two electromagnetic coils are preferably utilized, it is understood that only one electromagnetic coil is necessary to produce magnetic fields for vibration. In addition, although two driver circuits are shown for clarity, only one driver circuit is needed to drive both of electromagnetic coils 204 and 206. Furthermore, although signals to both electromagnetic coils 204 and 206 are described as the same in-phase signals, such signals may be 180° out-of-phase with each other if one of electromagnetic coils 204 and 206 is positioned in a reverse fashion. Finally, to maximize efficiency, controller 208 may produce other signals, such as a sine-wave signal or a triangle-wave signal, at electromagnetic coils 204 and 206. It is therefore intended in the appended claims to cover all such changes and modifications which fall within the true spirit and scope of the invention.

What is claimed is:

1. A vibrating apparatus, comprising:

a vibrating element having a first end fixedly mounted and a second end that includes a ferromagnetic material;

a first electromagnetic coil positioned adjacent to said ferromagnetic material;

a second electromagnetic coil positioned adjacent to said ferromagnetic material on a side substantially opposite said first electromagnetic coil; and a signal generator coupled to said first electromagnetic coil for generating a first signal to said first electromagnetic coil for producing first magnetic fields, said signal generator coupled to said second electromagnetic coil for generating a second signal to said second electromagnetic coil for producing second magnetic fields, the first and second magnetic fields exerting magnetic forces on said ferromagnetic material to vibrate said vibrating element, wherein said signal generator generates a first test signal at the first electromagnetic coil during a first time period, the first test signal having a first test frequency, wherein said signal generator measures a first test voltage at the second electromagnetic coil during the first time period, wherein said signal generator generates a second test signal at the first electromagnetic coil during a second time period, the second test signal having a second test frequency, and wherein said signal generator measures a second test voltage at the second electromagnetic coil during the second time period.

2. The vibrating apparatus according to claim 1, wherein said ferromagnetic material comprises a permanent magnet.

3. The vibrating apparatus according to claim 1, wherein said vibrating element has a resonating frequency, and wherein said signal generator is for generating a signal to vibrate said vibrating element at the resonating frequency.

4. The vibrating apparatus according to claim 1, further comprising:

a housing having said vibrating element, said first electromagnetic coil, and said signal generator disposed therein, said housing having said first end of said vibrating element fixedly mounted thereon.

5. A portable electronic device, comprising:

a housing;

a pliable element having a first end fixedly attached to said housing and a second end that includes a ferromagnetic material;

a first electromagnetic coil positioned adjacent to said ferromagnetic material;

a second electromagnetic coil positioned adjacent to said ferromagnetic material on a side substantially opposite said first electromagnetic coil; and a controller coupled to said first and said second electromagnetic coils, said controller for generating signals to said first and said second electromagnetic coils for producing magnetic fields therearound, the magnetic fields exerting magnetic forces on said ferromagnetic material to vibrate said pliable element;

wherein said controller generates a first test signal at the first electromagnetic coil during a first time period, the first test signal having a first test frequency, wherein said controller measures a first test voltage at the second electromagnetic coil during the first time period, wherein said controller generates a second test signal at the first electromagnetic coil during a second time period, the second test signal having a second test frequency, and wherein said controller measures a second test voltage at the second electromagnetic coil during the second time period.

6. The portable electronic device according to claim 5, wherein said pliable element has a resonating frequency, and wherein said controller is for generating a signal for vibrating said pliable element at the resonating frequency.

7. The portable electronic device according to claim 5, wherein said controller is for generating signals to said first and said second electromagnetic coils for continuously producing magnetic fields around said first electromagnetic coil that are substantially 180° out-of-phase with magnetic fields around said second electromagnetic coil.

8. The portable electronic device according to claim 5, wherein said ferromagnetic material comprises a permanent magnet.

9. The portable electronic device according to claim 5, wherein said portable electronic device comprises a radiotelephone.

10. The portable electronic device according to claim 5, wherein said portable electronic device comprises a pager.

11. A method of operating a vibrating apparatus, the vibrating apparatus comprising a vibrating element, a first electromagnetic coil, a second electromagnetic coil, and a processor, the vibrating element having a resonating frequency and a first end fixedly mounted and a second end that includes a ferromagnetic material, the first electromagnetic coil positioned adjacent to the ferromagnetic material and the second electromagnetic coil positioned adjacent to the ferromagnetic material on a side substantially opposite the first electromagnetic coil, the processor coupled to the first and the second electromagnetic coils, the method comprising the steps of:

generating signals, by the processor, to the first and the second electromagnetic coils to produce magnetic fields, the magnetic fields attracting and repelling the ferromagnetic material such that the vibrating element vibrates at the resonating frequency;

generating, during a first time period, a first test signal at the first electromagnetic coil, the first test signal having a first test frequency;

measuring, during the first time period, a first test voltage at the second electromagnetic coil;

generating, during a second time period, a second test signal at the first electromagnetic coil, the second test signal having a second test frequency; and measuring, during the second time period, a second test voltage at the second electromagnetic coil.

12. The method according to claim 11, further comprising the steps of:

comparing the first and the second test voltages; and selecting, in response to the step of comparing, one of the first and the second test frequencies for operating the vibrating apparatus.

13. The method according to claim 12, wherein the step of selecting one of the first and the second test frequencies further includes the step of selecting the first test frequency based upon the first test voltage being greater than the second test voltage, and selecting the second test frequency based upon the second test voltage being greater than the first test voltage.

14. The method according to claim 12, wherein the step of selecting one of the first and the second test frequencies further includes the step of selecting one of the first and the second test frequencies based upon the resonating frequency.

15. The method according to claim 11, further comprising the steps of:

calculating a third test frequency that is substantially equivalent to a sum of the second test frequency and a number, the number being proportional to a ratio of a difference between the second test voltage and the first test voltage and a difference between the second test frequency and the first test frequency; and selecting the third test frequency for operating the vibrating apparatus.

16. The method according to claim 11, further comprising the steps of:

comparing the first and the second test voltages;

selecting, in response to the step of comparing, the second test frequency;

generating, during a third time period, a third test signal to the first electromagnetic coil, the third test signal having a third test frequency;

measuring, during the third time period, a third test voltage at the second electromagnetic coil;

calculating a fourth test frequency that is substantially equivalent to a sum of the third test frequency and a number, the number being proportional to a ratio of a difference between the third test voltage and the second test voltage and a difference between the third test frequency and the second test frequency; and selecting the fourth test frequency for operating the vibrating apparatus.

* * * * *